(12) United States Patent
Waters (10) Patent No.: US 11,314,300 B2
(45) Date of Patent: *Apr. 26, 2022

(54) VOLTAGE TRANSITION CONTROL FOR USB POWER DELIVERY SOURCES

(71) Applicant: Texas Instruments Incorporated, Dallas, TX (US)

(72) Inventor: Deric Wayne Waters, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 81 days.

This patent is subject to a terminal disclaimer.

(21) Appl. No.: 16/542,037

(22) Filed: Aug. 15, 2019

(65) Prior Publication Data

US 2019/0369689 A1 Dec. 5, 2019

Related U.S. Application Data (63) Continuation of application No. 15/205,806, filed on Jul. 8, 2016, now Pat. No. 10,423,205.

(60) Provisional application No. 62/198,275, filed on Jul. 29, 2015.

(51) Int. Cl.
| | | |
|---|---|---|
| *G06F 1/00* | (2006.01) | |
| *G06F 1/26* | (2006.01) | |
| *G06F 13/42* | (2006.01) | |

(52) U.S. Cl.
CPC .......... *G06F 1/266* (2013.01); *G06F 13/4282* (2013.01); *Y02D 10/00* (2018.01)

(58) Field of Classification Search
CPC ...... G06F 1/266; G06F 13/4282; Y02D 10/00
See application file for complete search history.

(56) References Cited

U.S. PATENT DOCUMENTS

| | | |
|---|---|---|
| 5,884,086 A | 3/1999 | Amoni et al. |
| 6,091,617 A | 7/2000 | Moran |
| 6,459,175 B1 | 10/2002 | Potega |
| 6,952,748 B1 | 10/2005 | Guerrero, Jr. et al. |
| 8,176,498 B2 | 5/2012 | Huscroft et al. |
| 8,704,550 B2 | 4/2014 | Seth et al. |

(Continued)

FOREIGN PATENT DOCUMENTS

| | | |
|---|---|---|
| CN | 101142534 | 3/2008 |
| CN | 104781750 | 7/2015 |

(Continued)

OTHER PUBLICATIONS

Search Report for PCT Application No. PCT/US 2017068650, date of mailing of the international search report dated May 4, 2018, 1 page.

(Continued)

*Primary Examiner* — Xuxing Chen
(74) *Attorney, Agent, or Firm* — Mark Allen Valetti; Charles A. Brill; Frank D. Cimino (57) ABSTRACT

A circuit includes a controller to communicate with a sink device and communicate a plurality of power sources that are available to the sink device. A plurality of switch devices switch power from one of the plurality of power sources to the sink device in response to a control signal from the controller. A policy engine in the controller defines policies for the operation of the controller during different communications phases between the controller and the sink device.

18 Claims, 4 Drawing Sheets

(56) References Cited

U.S. PATENT DOCUMENTS

| | | |
|---|---|---|
| 2005/0197094 A1 | 9/2005 | Darshan et al. |
| 2006/0164062 A1 | 7/2006 | Stineman et al. |
| 2009/0055672 A1 | 2/2009 | Burkland et al. |
| 2009/0315467 A1 | 12/2009 | Schindler et al. |
| 2010/0127568 A1 | 5/2010 | Ng |
| 2010/0308783 A1* | 12/2010 | Farley .................. H02M 3/156 |
| 2012/0131357 A1 | 5/2012 | Karam et al. |
| 2013/0290765 A1 | 10/2013 | Waters et al. |
| 2014/0117970 A1 | 5/2014 | Kitagaki |
| 2014/0136863 A1 | 5/2014 | Fritchman et al. |
| 2014/0173141 A1 | 6/2014 | Waters |
| 2014/0208134 A1 | 7/2014 | Waters et al. |
| 2014/0320075 A1 | 10/2014 | Baurle |
| 2015/0145324 A1 | 5/2015 | Dwelley et al. |
| 2016/0043586 A1 | 2/2016 | Wang et al. |
| 2016/0094071 A1 | 3/2016 | Nge et al. |
| 2016/0163480 A1 | 6/2016 | Lester |
| 2016/0254902 A1 | 9/2016 | Nagase |
| 2016/0308452 A1 | 10/2016 | Motoki |
| 2016/1030845 | 10/2016 | Motoki |
| 2016/0349814 A1 | 12/2016 | Carpenter et al. |
| 2017/0031403 A1 | 2/2017 | Waters |
| 2017/0115711 A1 | 4/2017 | Jaramillo et al. |
| 2018/0309310 A1* | 10/2018 | Kuo ........................ H02J 1/001 |
| 2019/0324510 A1* | 10/2019 | Hijazi et al. ............ G06F 1/266 |

FOREIGN PATENT DOCUMENTS

| | | |
|---|---|---|
| CN | 105191039 A | 12/2015 |
| CN | 105629098 A | 6/2016 |
| EP | 1650401 A2 | 4/2006 |
| JP | WO2012060207 A1 | 5/2012 |
| WO | 2015119623 A3 | 8/2015 |

OTHER PUBLICATIONS

U.S. Appl. No. 15/392,047, filed Dec. 28, 2016, 29 pages.
Search Report for PCT Application No. PCT/US 2016044883, Date of mailing of the international search report dated Nov. 3, 2016, 1 page.
EU Search Report for Application No. 17887134.9-1201 / 3563517, dated Jan. 10, 2020.
CN Search Report Office Action for Pat. Appln No. 201780066105.9, dated Sep. 7, 2021, 19 pages, CN.
CN Search Report for Pat. Appln. No. 201780066105.9, dated Jan. 27, 2021.

* cited by examiner

VOLTAGE TRANSITION CONTROL FOR USB POWER DELIVERY SOURCES

CROSS-REFERENCE TO RELATED APPLICATION

Under 35 U.S.C. §§ 120, 119(e), this continuation application claims the benefit of priority to U.S. patent application Ser. No. 15/205,806, filed on Jul. 8, 2016, which claims the benefit of priority to U.S. Provisional Patent Application 62/198,275, filed on Jul. 29, 2015. The entirety of the above referenced applications are hereby incorporated herein by reference.

TECHNICAL FIELD

This disclosure relates to integrated circuits and more particularly to a circuit to control switching of power supply voltages on a serial bus.

BACKGROUND

Universal Serial Bus (USB) power-delivery (PD) and Type-C specifications have been released that enable delivery of higher power over new USB cables and connectors. The intent for this technology is to create a universal power plug for laptops, tablets, and so forth that may require more than 5V. The USB-PD specification defines a communication link between source and sink ports connected via a USB-PD cable and connectors. The communication is designed to be half-duplex and packet-based, for example. The packets contain various information that enable the two ports to communicate and negotiate the voltage and current the source port provides to the sink port. The ports can even negotiate to switch roles (Source to Sink and vice versa). The underlying communication in the USB-PD specification is Bi-phase Mark Coding (BMC). This communication occurs independently from normal USB communications that propagate through the same cable (but different wires). The USB-PD communication occurs over a different wire (e.g., the serial communication control (CC) wire) rather than the USB data wires. For USB Type-C cables, up to 15 W can be delivered even without USB-PD messaging by controlling the DC voltage on the CC pin, for example.

SUMMARY

This disclosure relates to a circuit to control switching of power supply voltages on a serial bus. In one example, a circuit includes a controller to communicate with a sink device and communicate a plurality of power sources that are available to the sink device. A plurality of switch devices switch power from one of the plurality of power sources to the sink device in response to a control signal from the controller. A policy engine in the controller defines policies for the operation of the controller during different communications phases between the controller and the sink device. The controller offers each of the plurality of power sources to the sink device during an initial communications phase. If the sink device requests one of the power sources from the controller in accordance with the initial communications phase that is greater than a minimum voltage power source, the controller offers a subset of the plurality power sources to the sink device during a subsequent communications phase between the controller and the sink device.

In another example, a semiconductor device includes a controller that communicates with a sink device and communicates a plurality of power sources that are available to the sink device. The plurality of power sources includes a minimum voltage power source, a medium voltage power source, and a maximum voltage power source. A policy engine in the controller defines policies for the operation of the controller during different communications phases between the controller and the sink device. The controller offers each of the plurality of power sources to the sink device during an initial communications phase. After the sink device requests one of the power sources from the controller in accordance with the initial communications phase that is greater than the minimum voltage power source, the controller offers a subset of the plurality power sources to the sink device during a subsequent communications phase between the controller and the sink device. The subset of the plurality of voltage sources offered by the controller includes the minimum voltage power source and one of the medium voltage power source and the maximum voltage power source.

In yet another example, a method includes communicating an offer of each of a plurality of power sources to a sink device during an initial communications phase. The method includes communicating an offer of a subset of the plurality of power sources to the sink device during a subsequent communications phase between the controller and the sink device after the sink device requests one of the power sources from the controller that is greater than a minimum voltage power source. The method includes switching power from one of the plurality of power sources to the sink device in response to a request for one of the power sources from the sink device.

DETAILED DESCRIPTION

This disclosure relates to a circuit to control switching of power supply voltages on a serial bus. The circuit includes a controller that provides a plurality of available powers sources to a requesting sink device over a serial interface such as a universal serial interface (USB), for example. A protocol is provided where policies are defined that limit the offerings of available power sources to the sink device after an initial power selection has been made to the controller by the sink device. By controlling the available supply offerings (e.g., rather than offering the complete list of power sources) that can be made in subsequent communications between the controller and the sink device, circuit complexities can be reduced thus lowering the overall cost of the serial interface described herein. For example, protection diodes on intermediate power supply source switch devices can be eliminated since switching between intermediate supply values is prevented by policy after the initial supply selection of the sink device. Also, the intermediate power supply sources can be controlled via a single controller output port rather than via multiple ports as with conventional systems. Furthermore, filtering components can be reduced across the switch devices further reducing the cost of the interface.

The controller can communicate with the sink device and communicate a plurality of power sources that are available to the sink device. A plurality of switch devices switch power from one of the power sources to the sink device in response to a control signal from the controller. A policy engine in the controller defines policies for the operation of the controller during different communications phases between the controller and the sink device. The controller offers each of the power sources to the sink device during an initial communications phase. After the sink device requests one of the power sources from the controller in accordance with the initial communications phase, the controller offers a subset of the available power sources to the sink device during a subsequent communications phase between the controller and the sink device. To reset the list of available power offerings to the sink device, the sink device can request the minimum voltage power source in a given communications sequence. Based on this request and after switching to the minimum voltage power level, the controller can then offer the full range of power supply offerings in subsequent communications with the sink device.

Figure 1:
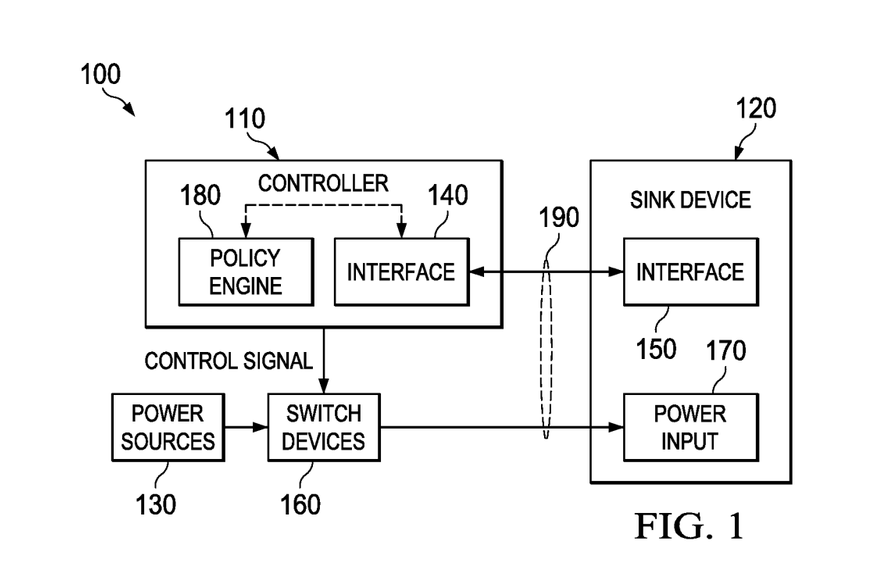
FIG. 1 illustrates an example schematic block diagram of a circuit to control switching of power supply voltages on a serial bus.

FIG. 1 illustrates an example schematic block diagram of a circuit to control switching of power supply voltages on a serial bus. As used herein, the term circuit can include a collection of active and/or passive elements that perform a circuit function such as an analog circuit or control circuit, for example. Additionally or alternatively, the term circuit can include an integrated circuit where all and/or some of the circuit elements are fabricated on a common substrate, for example.

A controller 110 can communicate with a sink device 120 and communicate a plurality of power sources 130 that are available to the sink device (e.g., 5V, 12V, 20V, and so forth). The controller 110 includes a serial interface 140 to communicate with a sink serial interface 150 on the sink device 120. The serial interface 140 is employed to communicate the available power sources 130 to the sink device 120 and to receive requests from the sink serial interface 150 with respect to a requested power source from the available power sources. A plurality of switch devices 160 switch power from one of the plurality of power sources 130 to the sink device 120 in response to a control signal from the controller 110. As shown, switched power from the switched devices 160 is provided to a power input 170 of the sink device 120. A policy engine 180 in the controller 110 defines policies for the operation of the controller during different communications phases between the controller and the sink device 120.

The controller 110 offers each of the plurality of power sources 130 (e.g., in a communications message between interfaces 140 and 150) to the sink device 120 during an initial communications phase. After the sink device 120 requests one of the power sources 130 from the controller 110 in accordance with the initial communications phase, the controller offers a subset of the plurality power sources to the sink device during a subsequent communications phase between the controller and the sink device. For example, if the controller 110 initially selects a 20V power source from a list of available sources of 5V, 12V, 20V, and 24V, then after the selection of 20V, only the 5V and the 20V options are offered to the sink device in subsequent communications.

By reducing the list of available offerings in this manner, circuit protections for switching between intermediate supply offerings can be reduced (e.g., no longer need to protect for the case of going for 20V to a lower voltage such as 12V). If the sink device 120 decides to select the minimum voltage (e.g., 5V) after its initial selection of 20V in this example, this operates to reset the available power source offerings to the full offering of sources in subsequent communications. If a higher voltage source is again selected, the reduced subset of offerings as defined by policies in the policy engine 180 can then be provided.

In one example, the controller 110 and the sink device 120 communicate over a universal serial bus (USB) power delivery (PD) interface which is shown schematically at 190. The policy engine 180 defines a policy for the controller 110 to offer a requested power source 130 received from the sink device 120 and from the initial communications phase including an offer of a minimum voltage power source from the plurality of power sources. If the sink device 120 requests the minimum voltage power source from the controller 110, the policy engine 180 defines a policy for the controller to offer each of the plurality of power sources 130 to the sink device after the request for the minimum voltage source from the sink device. As will be shown in the example circuit of FIG. 3, the minimum voltage source can be provided to the sink device 120 via two switch devices that are enabled via at least two ports from the controller 110.

At least one of the two switch devices 160 for the minimum voltage source can be protected via a Schottky diode connected across the device. The Schottky diodes for other voltage sources than the minimum source can be removed due to the switching policies and protocols described herein. Each of the plurality of voltage sources 130 other than the minimum voltage source can be provided to the sink device 120 via two switch devices 160 that are enabled concurrently via at least one port from the controller (See e.g., FIG. 3). Also, each of the two switch devices 160 can be filtered via a resistor and capacitor filter (versus multiple filters in conventional systems) coupled between a source and a gate of the switch devices 160 (See e.g., FIG. 3).

Figure 2:
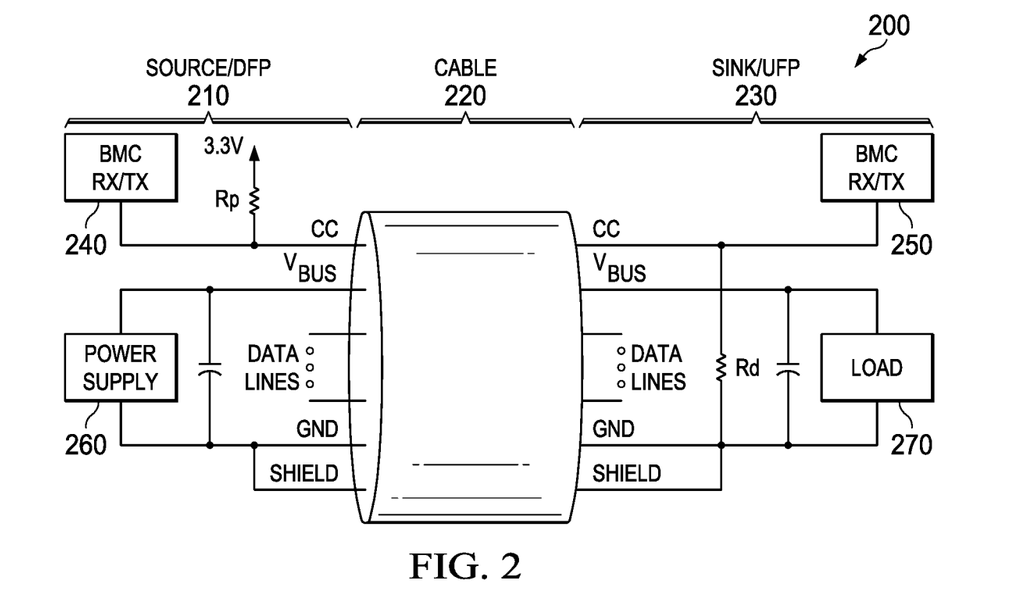
FIG. 2 illustrates another example schematic circuit diagram of a universal serial bus that employs controlled switching.

FIG. 2 illustrates another example circuit 200 a universal serial bus (USB) that employs controlled switching. The USB can include a source side 210 operated by the controller described herein that interfaces via a cable 220 to a sink side 230. The source side 210 includes a serial communications interface shown as CC (e.g., communications control) which can be tied to a receiver/transmitter 240 (RX/TX) of a controller (not shown) and pulled-up via resistor RP. The sink side 230 is also coupled to the CC link to a sink side RX/TX 250 which can be pulled-down via resistor RD. As shown, data lines can be provided for parallel communications across the USB 200 between devices. A single power supply (or source) 260 is provided via a voltage bus (VBUS) to a sink device load 270. Although a single source 260 is shown, a plurality of such sources can be switched to drive the load 270 via the switching protocols described herein.

The USB 200 can be controlled as an industry standard that defines the cables, connectors, and communications protocols used in a bus for connection, communication, and power supply between computers and electronic devices. It is currently developed by the USB Implementers Forum (USB IF). The USB 200 was designed to standardize the connection of computer peripherals (including keyboards, pointing devices, digital cameras, printers, portable media players, disk drives, network adapters, and so forth) to personal computers, both to communicate and to supply electric power. It has become commonplace on other devices, such as smart phones, PDAs and video game consoles. The USB 200 has effectively replaced a variety of earlier interfaces, such as parallel ports, as well as separate power chargers for portable devices. Although USB interfaces are described as an example, other serial port configurations that employ the power delivery and switching protocols described herein are possible.

Figure 3:
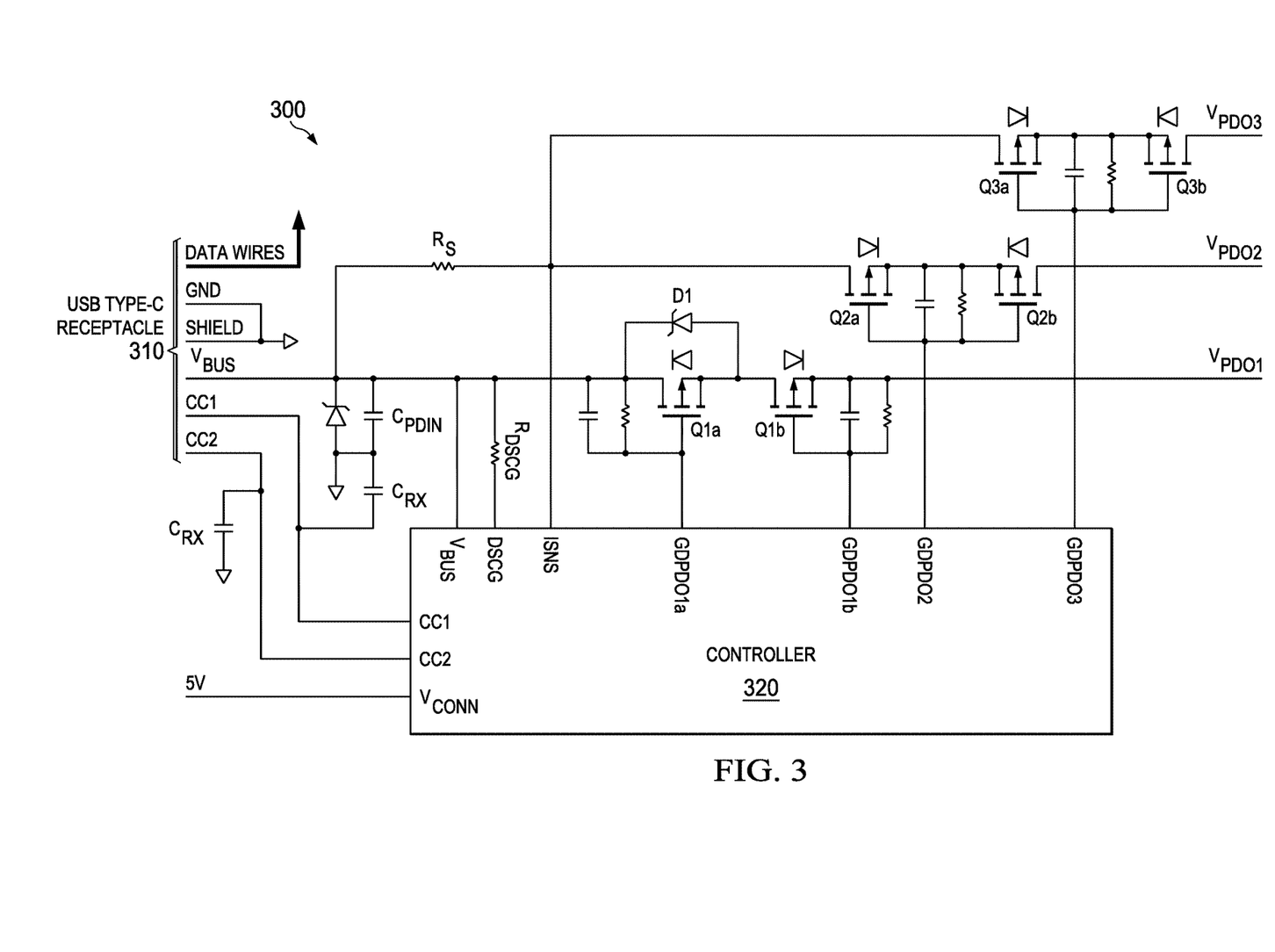
FIG. 3 illustrates an example of a semiconductor circuit to control switching of power sources on a serial bus.

FIG. 3 illustrates an example of a semiconductor circuit 300 to control switching of power sources on a serial bus. In this example, three power delivery sources are shown as VPDO1, VPDO2, and VPDO3 can be switched to a connector 310 to supply power and other communications to a sink device (not shown) as described herein. As shown, the connector 310 can include a ground and shield connections, a VBUS connection to provide the switched power sources described herein, and a serial control communications (CC) bus shown as CC1 and CC2. Two busses CC1 and CC2 are supported in case the connector 310 is plugged in upside down. Capacitors CRX and CPDN can be provided for added filtering of the VBUS. A controller 320 includes multiple output ports shown as GPD01 through GPD03. Output ports GPDO1a and GPDO1b control switch devices Q1a and Q1b which switch voltage (e.g., the minimum voltage offering) to the VBUS if requested by the sink device. Diode D1 is provided to facilitate that the voltage on VBUS does not fall too low during a transition from a higher voltage value to a lower voltage value. Each switch device can have separate RC filters connected from gate to source.

A single port GPDO2 can be employed to control switch device Q2a and Q2B which switch source VPDO2. Also, a single port GPDO3 can be employed to control switch device Q3a and Q3B which switch source VPDO3 if requested by the respective sink device. Note that neither Q2a or Q3a require a protection device such as D1 for Q1a. This is due to the switching protocols and policies described herein that prevent transitions from higher voltage levels to values other than VPDO1 which reduces the overall hardware complexities of the circuit 300 in several instances. Also, single output controls can control Q2a/Q2B and Q3a/Q3b such as required for Q1a and Q2b. Moreover, less complex filtering (single filter versus double filtering) is required for Q2a/Q2B and Q3a/Q3b such as required for Q1a and Q2b.

The circuit 300 represents one possible example implementation that can be controlled via a policy engine (not shown) in the controller 320. Notably, after the first time the sink requests a power delivery option (PDO) other than PDO1 the Source re-sends a Source Capability message but includes only PDO1 and the PDO just requested by the respective sink. The USB PD requires that PDO1 always be included, and the Source now knows which of the other PDO's the Sink prefers so it can send only that PDO. If the Sink later requests PDO1, then the Source can re-send its full list of PDO's. By re-sending a modified list of PDO's in its Source Capabilities message, the Source prevents the Sink from making a request that requires transitioning directly between PDO3 and PDO2, for example. This extends to systems with any number of PDO's and allows for the simplified system as represented by the circuit 300.

The following tables 1 and 2 represent example transition states describing example switch device states during a transition from VPDO3 to VPDO1 for Table 1 and a transition from VPDO1 to VPDO2 for Table 2.

Transition Table 1 from $V_{PDO3}$ to $V_{PDO1}$:

| Step # | VBUS | Q1a | Q1b | Q2a & Q2b | Q3a & Q3b |
|---|---|---|---|---|---|
| 1 | $V_{PDO3}$ | Off | Off | Off | On |
| 2 | $V_{PDO3}$ | Off | On | Off | On |
| 3 | $V_{PDO1}$-0.3 V | Off | On | Off | Off |
| 4 | $V_{PDO1}$ | On | On | Off | Off |

Transition Table 2 from $V_{PDO1}$ to $V_{PDO2}$:

| Step # | VBUS | Q1a | Q1b | Q2a & Q2b | Q3a & Q3b |
|---|---|---|---|---|---|
| 1 | $V_{PDO1}$ | On | On | Off | Off |
| 2 | $V_{PDO1}$-0.3 V | Off | On | Off | Off |
| 3 | $V_{PDO2}$ | Off | On | On | Off |
| 4 | $V_{PDO2}$ | Off | Off | On | Off |

Figure 4:
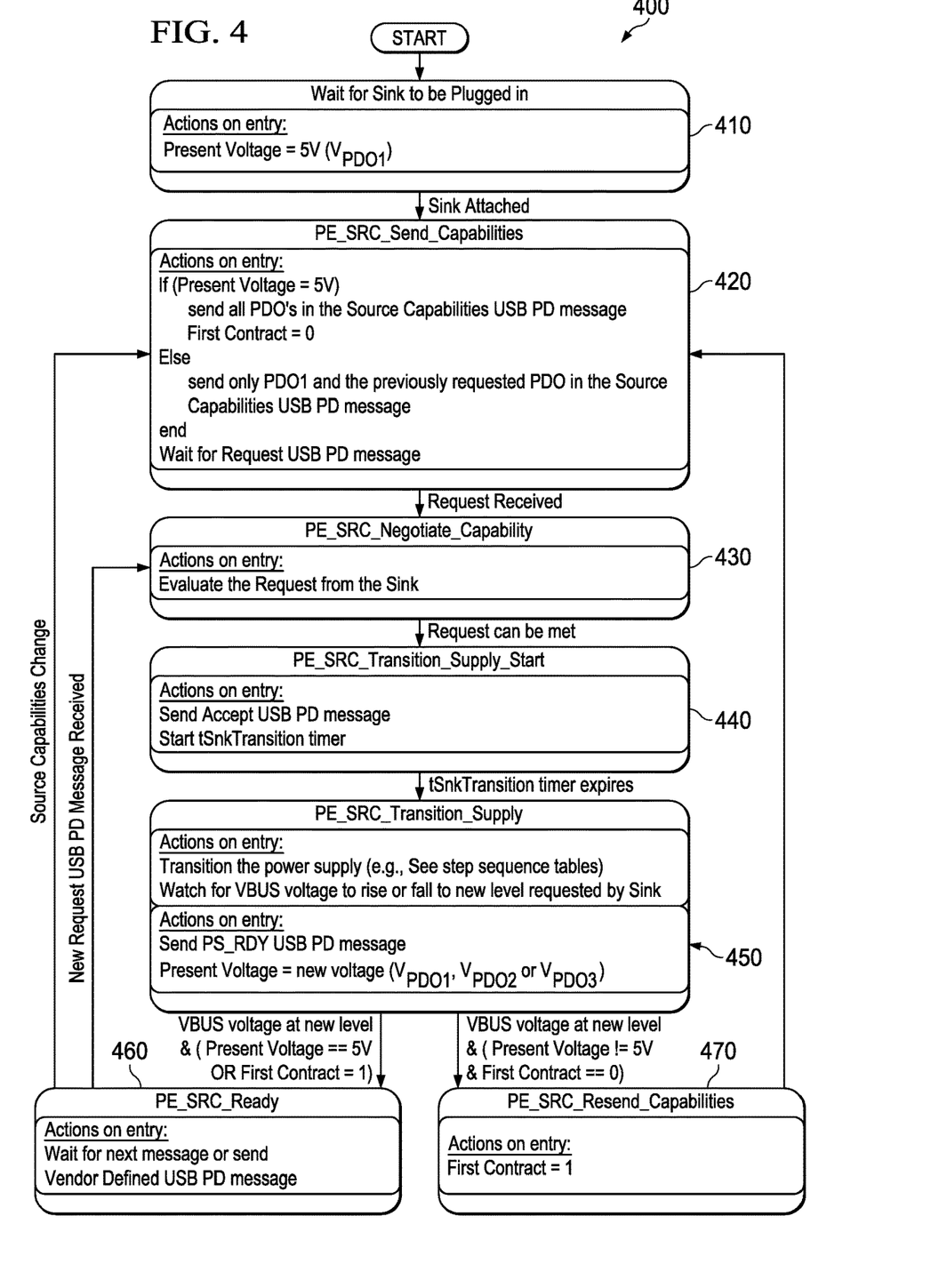
FIG. 4 illustrates an example method for controlling switching of power sources on a serial bus.
Figure 5:
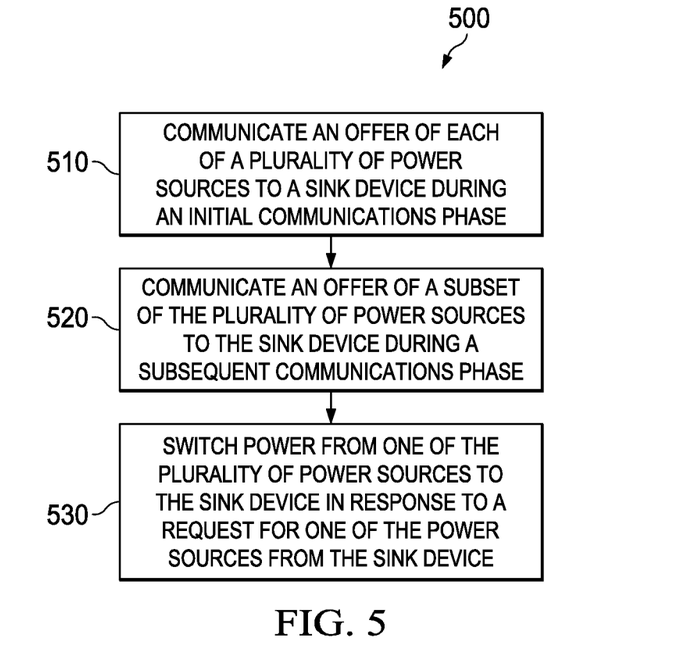
FIG. 5 illustrates an example method to communicate and control switching of power sources on a serial bus.

In view of the foregoing structural and functional features described above, an example method will be better appreciated with reference to FIGS. 4 and 5. While, for purposes of simplicity of explanation, the methods are shown and described as executing serially, it is to be understood and appreciated that the methods are not limited by the illustrated order, as parts of the methods could occur in different orders and/or concurrently from that shown and described herein. Such methods can be executed by various components configured in an integrated circuit, processor, or a controller, for example.

FIG. 4 illustrates an example method 400 for controlling switching of power sources on a serial bus. At 410, the method 400 presents a minimum voltage (e.g., 5V) as it verifies that a sink is plugged in. At 420, if the present voltage is the minimum, all the available power sources (e.g., Power Delivery Options (PDO)) are presented as source capabilities. Otherwise, only present the minimum voltage along with the previously requested power source in a subsequent communications message (e.g., USB power delivery (PD) message). At 430, the method 400 includes evaluating a given request from a sink device during a respective negotiation session between the controller (e.g., source) and the sink. At 440, the method 400 includes sending an accept USB power delivery message and starts a transition timer at the beginning of a period where the request from the sink device can be met.

After the timer of 440 expires, a transition to 450 occurs. At 450, a transition to the requested power source occurs (See e.g., transition tables above). This can include monitoring the bus voltage supplied to the power input of the sink device to observe that it has risen or fallen to the new requested voltage level. This can also include sending a power supply ready message and presenting the new requested power supply voltage to the sink device. For the case where the sink requests the minimum voltage VPDO1, the policy engine may transition to 460 and not pass through 470 to resend source capabilities. At 460, if the bus voltage is at its new level and a flag has been set that this is the first contract between the controller and the sink device, the controller waits for a next message or sends a vendor defined power delivery message. This can include receiving a new request power delivery message back to 430 and broadcasting a source capabilities change back to 420 for subsequent communications to the sink device. At 470, if the voltage bus has transitioned to the new power level and the first contract is false, the first contract is set to true and the method proceeds back to 420 to commence with subsequent communications between the controller and the sink device.

FIG. 5 illustrates an example method 500 to communicate and control switching of power sources on a serial bus. At 510, the method 500 includes communicating an offer of each of a plurality of power sources to a sink device during an initial communications phase (e.g., via controller 110 and interface 140 of FIG. 1). At 520, the method 500 includes communicating an offer of a subset of the plurality of power sources to the sink device during a subsequent communications phase between the controller and the sink device after the sink device requests one of the power sources from the controller that is greater than a minimum voltage power source (e.g., via controller 110 and interface 140 of FIG. 1). At 530, the method 500 includes switching power from one of the plurality of power sources to the sink device in response to a request for one of the power sources from the sink device (e.g., via controller 110 and switch devices 160 of FIG. 1). The method 500 can also include communicating an offer of a requested power source from the sink device from the initial communications phase and a minimum voltage power source from the plurality of power sources.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. Additionally, where the disclosure or claims recite "a," "an," "a first," or "another" element, or the equivalent thereof, it should be interpreted to include one or more than one such element, neither requiring nor excluding two or more such elements.

What is claimed is:

1. A circuit comprising:
   a first input terminal configured to receive a first voltage;
   a second input terminal configured to receive a second voltage higher than the first voltage;
   a third input terminal configured to receive a third voltage higher than the second voltage;
   an output terminal;
   a switch network configured to receive a selection signal and enable a conductive path between the output terminal and only one of the first, second, or third input terminal based on the selection signal, the switch network including:
      a first switch coupled between the output terminal and the first input terminal, the first switch having a first control terminal configured to receive a first power data object (PDO) signal of the selection signal;
      a second switch coupled between the output terminal and the second input terminal, the second switch having a second control terminal configured to receive a second PDO signal of the selection signal; and
      a third switch coupled between the output terminal and the third input terminal, the third switch having a third control terminal configured to receive a third PDO signal of the selection signal;
   a diode having an anode coupled to the first input terminal, and a cathode coupled to the output terminal; and
   a controller configured to:
      receive a selection corresponding to one of the first, second, or third voltage during a first communication phase with a sink device;
      generate one of the first, second, or third PDO signal based on the selection; and
      offer, during a second communication phase after the first communication phase, either one of the second or third voltage to the sink device if the selection excludes the first voltage.

2. The circuit of claim 1, wherein the diode is configured to sustain a voltage at the output terminal to be above a threshold voltage when the switch network transits the conductive path from being between the output terminal and the third input terminal, to being between the output terminal and the first input terminal.

3. The circuit of claim 1, wherein the diode is configured to sustain a voltage at the output terminal to be above a threshold voltage when the switch network transits the conductive path from being between the output terminal and the second input terminal, to being between the output terminal and the first input terminal.

4. The circuit of claim 1, wherein the output terminal includes a VBUS terminal of a USB Type-C receptacle.

5. The circuit of claim 1, wherein the diode is coupled in parallel with the first switch.

6. The circuit of claim 1, wherein the conductive path between the output terminal and the second input terminal excludes a second diode coupled in parallel with the second switch.

7. The circuit of claim 5, wherein the conductive path between the output terminal and the third input terminal excludes a third diode coupled in parallel with the third switch.

8. The circuit of claim 1, wherein the controller is configured to offer, during the second communication phase, all of the first, second, and third voltages to the sink device if the selection correspond to the first voltage.

9. The circuit of claim 1, wherein the controller is configured to, during the second communication phase, offer only the first voltage and the third voltage to the sink device if the selection during the first communication phase corresponds to the third voltage.

10. The circuit of claim 1, wherein the controller is configured to, during the second communication phase, exclude the second voltage from being offered to the sink device if the selection during the first communication phase corresponds to the third voltage.

11. The circuit of claim 1, wherein the controller is configured to, during the second communication phase, offer only the first voltage and the second voltage to the sink device if the selection during the first communication phase corresponds to the second voltage.

12. The circuit of claim 1, wherein the controller is configured to, during the second communication phase, exclude the third voltage from being offered to the sink device if the selection during the first communication phase corresponds to the second voltage.

13. A power delivery (PD) system comprising:
   a first input terminal configured to receive a first voltage;
   a second input terminal configured to receive a second voltage higher than the first voltage;
   a third input terminal configured to receive a third voltage higher than the second voltage;
   an output terminal;
   a switch network configured to receive a selection signal, and enable a conductive path between the output terminal and only one of the first, second, or third input terminal based on the selection signal;

a diode having an anode coupled to the first input terminal, and a cathode coupled to the output terminal; and a controller configured to:
receive a selection corresponding to one of the first, second, or third voltage during a first communication phase with a sink device;
generate the selection signal based on the selection; and
offer, during a second communication phase after the first communication phase, either one of the second or third voltage to the sink device if the selection excludes the first voltage.

14. The PD system of claim 13, wherein the controller is configured to offer, during the second communication phase, all of the first, second, and third voltages to the sink device if the selection correspond to the first voltage.

15. The PD system of claim 13, wherein the controller is configured to, during the second communication phase, offer only the first voltage and the third voltage to the sink device if the selection during the first communication phase corresponds to the third voltage.

16. The PD system of claim 13, wherein the controller is configured to, during the second communication phase, exclude the second voltage from being offered to the sink device if the selection during the first communication phase corresponds to the third voltage.

17. The PD system of claim 13, wherein the controller is configured to, during the second communication phase, offer only the first voltage and the second voltage to the sink device if the selection during the first communication phase corresponds to the second voltage.

18. The PD system of claim 13, wherein the output terminal includes a VBUS terminal of a USB Type-C receptacle.

* * * * *